March 6, 1962  H. SCHULLER  3,023,774
SEALING OR SHUTTER VALVES
Filed April 7, 1960  2 Sheets-Sheet 1

INVENTOR
Heri SCHULLER

BY Robert H. Jacob
AGT.

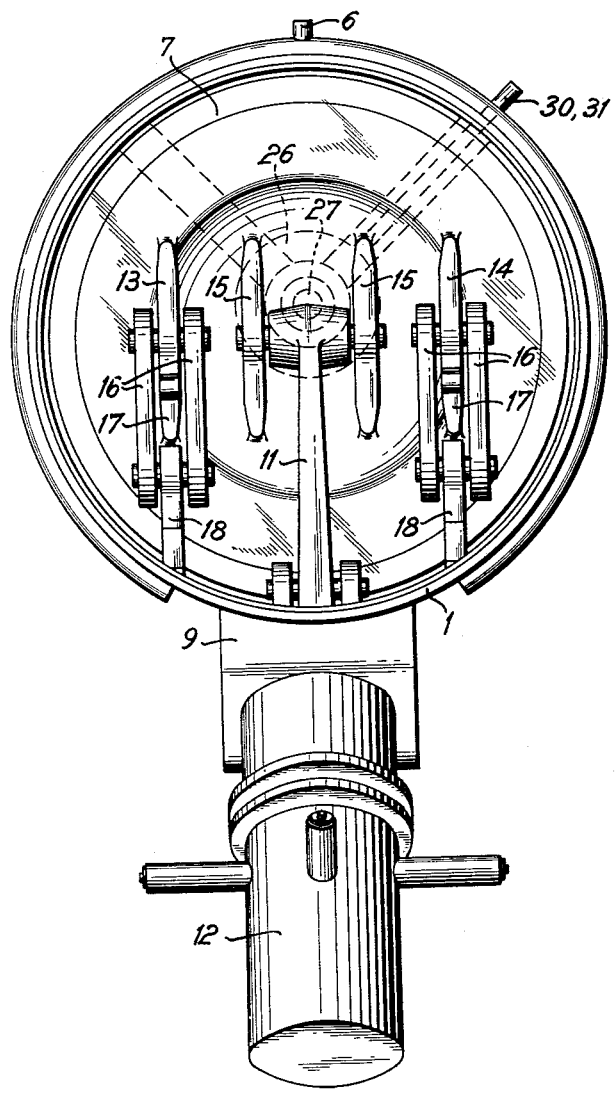

United States Patent Office 3,023,774
Patented Mar. 6, 1962

3,023,774
SEALING OR SHUTTER VALVES
Heri Schulier, Rohrbach, Saar, Germany, assignor to
Th. Jansen G.m.b.H., Rohrbach, Saar, Germany
Filed Apr. 7, 1960, Ser. No. 20,588
Claims priority, application Germany Apr. 9, 1959
10 Claims. (Cl. 137—553)

The present invention relates to sealing or shutter valves particularly for use in gas mains of large diameter.

For gas mains having large diameters shutters or flaps have proved successful as shut-off or sealing devices, where the flap is pivotally carried in the pipe by three levers in a manner that in its closed position it is uniformly in contact with an annular sealing surface normal to the axis of the pipe and during opening is angularly moved within the pipe until it lies parallel with the pipe axis. Generally the middle lever serves as a guide link while the other two or outer levers are operated from a common shaft to act as swivel levers. However, it has hitherto only been possible to build such shutter plates or flaps economically for use where comparatively minor differential pressures in the pipe lines are involved, for it is immediately apparent that the swivel levers and their actuating members, even with a difference in differential pressure of, for example, atmospheres 0.5 and a pipe diameter of 1 to 2 meters, would be disproportionately thick and heavy and in turn the cross sectional area of the pipe left free for gas flow would be greatly restricted. For operating reasons the pivotal center of the swivel levers is always outside the flow cross section of the pipe. As a further disadvantage it may be mentioned that where fittings which are exposed to heat influences are concerned, a single-part, comparatively narrow metal sealing surface of such large diameter for closing with an absolutely gas-tight seal can be constructed only with very great difficulty.

The primary object of the present invention is to so construct a shutter valve as to permit its use when comparatively large differential pressures occur in the pipe which it is required to seal.

Another object is to improve both the mechanism and the sealing quality of a shutter valve more particularly in connection with the use of a sealing shutter plate or flap in gas mains which are liable to contain radio-active contaminated media.

According to the present invention two independently operative actuating means are provided for the valve, one being interlockingly connected to a rocking lever arranged in the middle of the shutter plate and on one side thereof, while the other is disposed on the other side of the shutter plate where it acts as a pressure or brake piston on the valve.

The actuating means interlockingly connected to the shutter plate preferably includes a piston which is adapted for connection to the pivotal lever of the shutter valve, the cylinder of the piston being welded to a housing of the valve in order to obtain a structure without external stuffing boxes.

In addition to the rocking lever of the actuating means of the shutter plate the latter is also provided with two other guide links or rods. The lugs on the shutter plate for these guide rods are extended like horns until they abut, when the valve is in its open position, against corresponding counter surfaces in the valve housing which serve as stops.

The shutter plate of the valve is provided on its periphery with two spaced sealing surfaces arranged in series and acting in the same direction, one of which is in the form of a resilient ring while the peripheral space between the two sealing surfaces is adapted to be exhausted by way of bores formed in the walls of the valve housing passage.

If preferred a locking device may be provided for the two end positions of displacement of the shutter plate, for example by providing the driving piston for the rocking lever with grooves into which spring-loaded balls enter.

Finally, a position indicator without stuffing boxes may also preferably be provided for indicating the existing position of the shutter plate, which indicator preferably comprises two corrugated tubing compensators connected in series with outwardly extending bars.

Further features of the invention and details of the advantages achieved thereby will be apparent from the following description of one embodiment of the invention which is illustrated by way of example in the accompanying drawings in which:

FIGURE 2 is a front elevation with the shutter or flap in its closed position.

Figure 1:
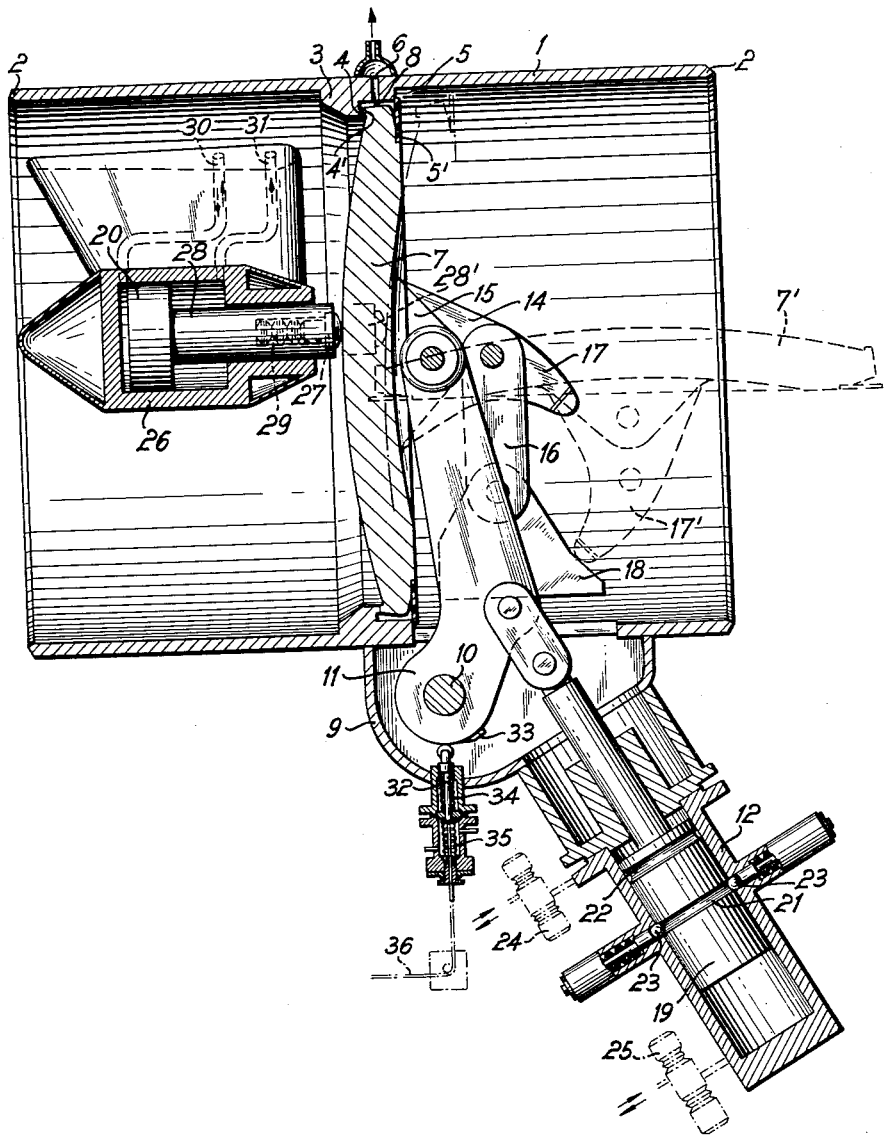
FIGURE 1 is an axial section through the housing of the shutter or flap valve.

In the drawings the shutter housing 1 has a diameter corresponding to the pipe line (not shown) and has ends 2 which are adapted to be welded to the pipe line. Approximately at its center the housing 1 has an internally mounted annular bead 3 with two sealing surfaces 4 and 5 for the reception of the shutter plate 7 of the valve, said surfaces 4, 5 being arranged steplike in series and the latter of them has a larger diameter than the former. Bores 6 are formed between the two sealing surfaces 4 and 5 in the wall of the housing, through which the space 8 between the two sealing surfaces 4 and 5 can be exhausted when the shutter 7 is closed.

A dome 9 is mounted or formed on the housing 1, preferably on the lower side of the latter. In this dome is mounted a shaft 10 of a rocking lever 11 of the valve and to it is secured a cylinder 12 of the pneumatic actuating device for the lever. Such a pneumatic device may be used for example if the shutter plate of the present invention is to be used as a shut-off member in the primary circuit ($CO_2$) of a modern atomic power station. Obviously, however, an electric or any other suitable drive may also be employed.

The shutter plate 7 has three lugs 13, 14 and 15, of which the last mentioned is a double lug and is connected to one end of a rocking lever 11, while the two lugs 13 and 14 are connected to side guide links 16 which, as shown in FIGURE 2, may be constructed in pairs. The transmission and construction of all the linking and welding points are such that the shutter plate 7 with its two sealing surfaces 4' and 5' is adapted to rest uniformly on the sealing surfaces 4 and 5 of the bead 3 in the housing 1. As also shown in the drawings the sealing surface 5' may also be constituted by a resilient annular member or the like which, due to this resilience, is applied with a predetermined degree of pressure against the opposing sealing surface 5. The pressure of the medium then urges both sealing surfaces firmly against the corresponding sealing surfaces of the valve housing 1. The aforementioned exhaustion of the space between the two sealing surfaces then results in an absolutely tight seal, such as is necessary for example in the case of atomic power plants.

The two external lugs 13 and 14 of the shutter plate 7 have hornlike curved projections 17 which abut against corresponding stops 18 in the housing 1 when the shutter 7 is fully opened.

The shutter 7 is operated on the one hand by a piston mechanism 19 of a cylinder 12 acting directly on the rocking lever 11 and having a direct driving connection there-with and, on the other hand by a piston 20 which is arranged on the opposite side of the shutter 7 and acts only as a pressure or as a braking piston on the shutter without being positively connected thereto.

The piston 19, which is double acting and is connected to the rocking lever 11, may be provided with one or, as shown in FIGURE 1, with two annular grooves 21, 22 which are arranged in planes of the piston which correspond to the two end positions of the shutter plate and for locking purposes are engaged by spring biased balls 23. The valves 24 and 25 control the double acting cylinder 12. Obviously the described locking device can engage on the piston rod instead of on the piston.

The pressure piston 20 on the other side of the shutter plate 7 is also double acting and moves freely in a cylinder 26 which is fitted in the valve housing 1 by means of streamlined supports. A pressure member 27 on the end of the piston rod 28 of the piston 20 may be resiliently mounted by means of plate springs 29 so as to resiliently absorb jolts when brought into contact with the shutter 7. Where the piston is double acting, two control pipe lines 30 and 31 are provided, but in many cases a single acting cylinder will suffice for the required purpose.

The two pistons 19 and 20 for actuating the shutter 7 may be operated either singly or in unison. In the embodiment shown compressed air or compressed gas is used as the operating medium. By means of the pressure piston 20 it is possible to overcome considerable differences in pressures when the shutter 7 is opened. After the shutter is opened the pressure piston 20 preferably remains in its end position which is illustrated by broken lines at 28' so that when the shutter is closed said piston can receive and retard the closure movement of said shutter. Thus hard impacts against the sealing surfaces and the entire pipe line are avoided. As in the case of the piston 19 the piston 20 may also be replaced by an electric or the like drive.

The shutter 7 is indicated in full lines in its closed position (FIGURE 1) and in its open position by dotted lines 7'. Similarly the horn-like extensions appear in full lines at 17 and in dotted lines in position 17' where they contact the abutments 18.

With the shutter valves of the present invention particularly when used in pipe lines in which dangerous media are being conveyed it is necessary to provide a position indicator for the shutter. Mechanical indicators which disclose all shutter positions operate most reliably. However, it is the sealing of the indicating rod which is essential and difficult.

In the illustrated embodiment of the present invention an indicating rod 32 is provided for operative engagement with a correspondingly constructed part of the movement mechanism of the shutter 7, for example with the rocking lever 11, which has a projection or cam 33 located within the range of contact of the indicating rod 32. Sealing is obtained by two corrugated tubing compensators 34 and 35, the inner one of which seals the rod 32 relative to an exhaustible safety chamber, while the outer compensator 35 closes the safety chamber from the outside. An extension of the indicating rod 32 leading to any desired indicating instrument is indicated at 36.

With the construction of a shutter in accordance with the present invention it becomes possible to operate the shutter particularly when there are comparatively large differential pressures in the pipe. Due to the construction of the sealing surfaces and the means of exhaustion provided between them the shutter, when closed, can respond to the very highest requirements of the technique of sealing and is retained in its two end positions by the locking device. Finally apart from its other structural features such as the absence of stuffing boxes of any kind, the present invention renders possible the use of a position indicator and particularly also the use of a shutter valve in pipe lines wherein dangerous media are being conveyed, such as for example in atomic power stations with radio-actively contaminated media.

Having now described my invention with reference to the embodiment illustrated herein, I do not wish to be limited thereto, but what I desire to protect by United States Letters Patent is set forth in the appended claims.

1. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate.

2. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said sealing surface comprising a pair of annular sealing planes disposed in series with one another and said shutter plate having a pair of sealing planes effective in the same direction including one defined by an elastic ring and operative to cooperate with said planes of said sealing surface.

3. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe.

4. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve.

5. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said sealing surface comprising a pair of annular sealing planes disposed in series with one another and said shutter plate having a pair of sealing planes effective in the same direction including one defined by an elastic ring and operative to cooperate with said planes of said sealing surface, and a plurality of apertures provided intermediate said annular sealing planes for evacuating the space therebetween.

6. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve, and locking means associated with the open position and with the closed position of said shutter plate.

7. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve, and locking means associated with the open position and with the closed position of said shutter plate, said locking means including a pair of grooves in said piston and spring loaded balls disposed in said cylinder operative to engage said grooves.

8. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve, and a position indicator disposed externally of said pipe having a slidable member for engagement with a member of said first actuating means.

9. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve, and a position indicator disposed externally of said pipe having a slidable member for engagement with a member of said first actuating means, and a pair of series connected corrugated tube compensators, said slidable member being a rod extending through said compensators and being connected externally of said pipe to conventional indicating means.

10. Shutter valve for gas pipes of large diameter adapted particularly for conducting radio-actively contaminated media, comprising an annular sealing surface extending circumferentially of the inner periphery of a large pipe, a shutter plate mounted in said pipe having a pivot connection substantially centrally thereof, rocking means pivotally supporting said shutter plate for uniform engagement in closed condition with said sealing surface, said plate being pivotally movable to open position within said pipe, first and second actuating means for said shutter plate operative independently of one another, said first actuating means including said rocking means being disposed on one side of said plate, said first actuating means including a pivot lever having one end interconnected with said pivot connection, said second actuating means being disposed on the other side of said plate and including a force transmitting and pressure member operable to exert a braking effect on said plate, said sealing surface comprising a pair of annular sealing planes disposed in series with one another and said shutter plate having a pair of sealing planes effective in the same direction including one defined by an elastic ring and operative to cooperate with said planes of said sealing surface, said first actuating means including a piston connected to said pivot lever and movable in a cylinder disposed externally of said pipe, and a pair of lugs having horn-like projections and secured to said plate laterally of said pivot connection, a pair of pivot links, one each pivotally connected at one end to one of said lugs, a pair of pivot supports, each connected to the other end of one of said links and each presenting an abutment for engagement by one of said projections in the open condition of said valve, and a plurality of apertures provided intermediate said annular sealing planes for evacuating the space therebetween, and locking means associated with the open position and with the closed position of said shutter plate.

No references cited.